United States Patent
Tanaka et al.

[11] Patent Number: 6,141,310
[45] Date of Patent: Oct. 31, 2000

[54] DISC PLAYING APPARATUS

[76] Inventors: Choku Tanaka; Shinsaku Tanaka, both of 3-13-24, Seijo, Setagaya-ku, Tokyo; Akira Iwakiri, 3-28-7, Minamimachi, Kichijoji, Musashino-shi, Tokyo; Shozo Nishimura, 1226-52, Kanamori, Machida-shi, Tokyo, all of Japan

[21] Appl. No.: 08/941,345

[22] Filed: Sep. 30, 1997

[30] Foreign Application Priority Data

Oct. 4, 1996 [JP] Japan .................................... 8-283226

[51] Int. Cl.$^7$ .................................................. G11B 33/02
[52] U.S. Cl. ........................................ 369/75.2; 369/77.1
[58] Field of Search ................................ 369/75.1, 75.2, 369/77.1, 77.2

[56] References Cited

U.S. PATENT DOCUMENTS

| | | | |
|---|---|---|---|
| 4,969,140 | 11/1990 | Koiwa et al. ........................... | 369/77.1 |
| 5,031,171 | 7/1991 | Kurumada et al. ..................... | 369/270 |
| 5,132,958 | 7/1992 | Camps et al. .......................... | 369/77.1 |
| 5,204,849 | 4/1993 | Yamada et al. ........................ | 369/75.2 |
| 5,572,497 | 11/1996 | Kim et al. .............................. | 369/77.2 |
| 5,596,561 | 1/1997 | Toyoguchi .............................. | 369/77.1 |
| 5,737,293 | 4/1998 | Kawamura et al. ................... | 369/77.1 |

FOREIGN PATENT DOCUMENTS

| | | |
|---|---|---|
| 59-75457 | 4/1984 | Japan . |
| 7-19418 | 3/1995 | Japan . |

*Primary Examiner*—Brian E. Miller
*Assistant Examiner*—Tod Kupstas
*Attorney, Agent, or Firm*—Dickinson Wright PLLC

[57] ABSTRACT

The invention relates to a disc playing apparatus, in which a disc inserted through a disc inserting slot is held on a turntable for playing back data with an optical pick-up, and released from the turntable and forced back to the outside of the disc inserting slot. The disc playing apparatus can be simple in construction, small in size, and inexpensive in the cost of manufacture. A disc holder for transferring the disc takes hold of the outer edge of the disc. The operations of the disc holder and a clamping mechanism are controlled by a timing control mechanism, which is driven by a single motor. The timing control mechanism has a partial gear. The timings of operation of various parts are controlled by selectively using a with-teeth portion and a without-teeth portion of a partial gear. The timing control mechanism is reversibly operable in dependence on the direction of motor rotation. Various parts of the apparatus are reversibly operable when loading and unloading the disc.

4 Claims, 10 Drawing Sheets

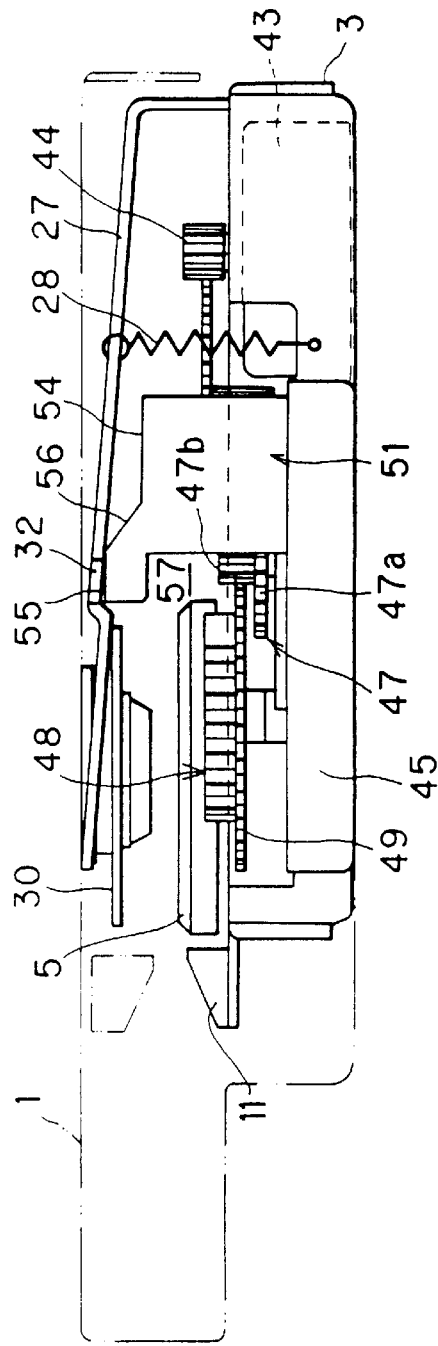
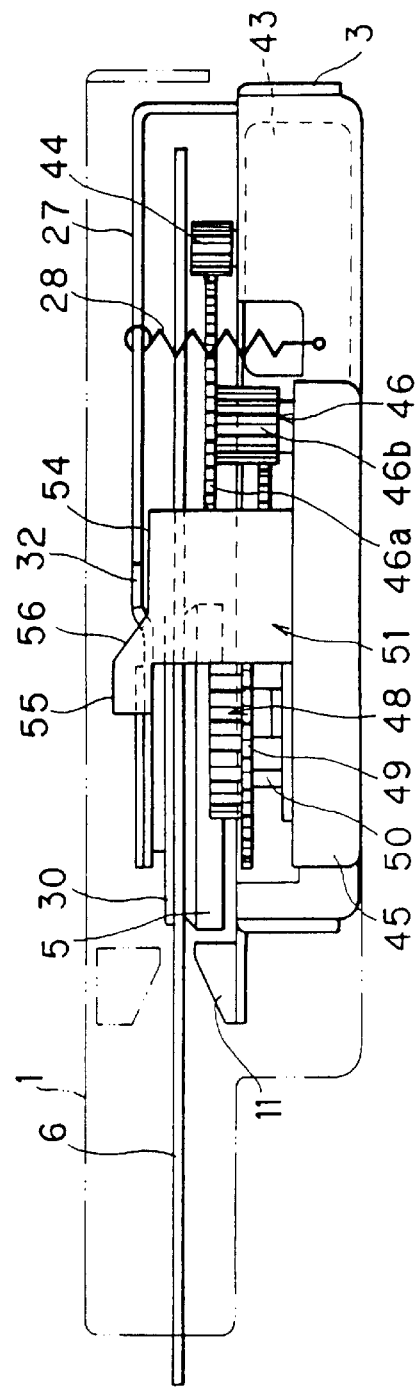
FIG. 7A
FIG. 7B

DISC PLAYING APPARATUS

BACKGROUND OF THE INVENTION

1. Field of the Invention

This invention relates to a disc playing apparatus, in which a disc inserted through a disc inserting slot is brought to and held on a turntable for playing back data with an optical pick-up, and is then released from the turntable and forced back to the outside of the disc inserting slot.

2. Description of the Prior Art

A disc playing apparatus for playing data recorded on a disc, such as a CD, a VCD, a DVD and a CD-ROM, has a mechanism for transferring a disc between the disc inserting slot and a turntable and also a mechanism for causing the disc to be held on and released from the turntable.

A well-known system in which these mechanisms are motor driven, are disclosed in Japanese Patent Publication No. 7-19418. This system has a drive member, which has a pair of cam grooves, i.e., one for transferring a disc and one for securing the disc to disc drive means, and a lever which couples the disc transfer cam groove and a disc holder member to each other. The drive member is linearly displaced with rotation of a motor, whereby the disc holder member is displaced by the disc transfer cam groove, and the disc is set on and released from the disc drive means by the cam groove for securing the disc to the disc drive means.

In this prior art apparatus, the two different cam grooves are sequentially made operative by utilizing the linear displacement of the drive member. The linear displacement, therefore, should be at least the sum of the displacement necessary for the disc transfer and the displacement necessary for securing the disc to the disc drive means. In addition, with a protuberance provided on the lever at an end thereof and engaged in a cam groove, a linear displacement of an inclined portion of the cam groove is converted into a corresponding rocking movement of the lever, which is in turn converted into a linear displacement of the disc holder member. Therefore, setting a gentle inclination angle of the inclined portion of the cam groove to the moving direction of the drive member, results in an increased linear displacement thereof. On the other hand, approaching the inclination angle to 90° increases the width direction size of the drive member to increase the motor load.

An object of the invention is to provide a disc playing apparatus, which can highly accurately control the timings of causing the disc transfer and the holding and releasing of the disc on and from the turntable, while being small in size, simple in construction and inexpensive.

SUMMARY OF THE INVENTION

In the disc playing apparatus according to the invention, when a disc is inserted through a disc inserting slot, a disc holder takes hold of the outer edge of the disc, whereupon rotation of a partial gear in a timing control mechanism in one direction is caused by a motor, causing the disc holder to be displaced by a with-teeth portion or toothed portion of the partial gear up to a position to transfer the disc to and from a turntable. At this time, the disc holder is detached from the with-teeth portion and held stationary for a while. Subsequently, the timing control mechanism causes a clamping mechanism to hold the disc on the turntable and release the disc holder from the disc. In a disc unloading operation, the partial gear is reversely rotated by the motor. The timing control mechanism is thus operated reversely to cause an entirely reverse operation to the disc loading operation.

The transfer of the disc holder between the disc receiving position and the position to transfer the disc to and from the turntable, is brought about by the with-teeth portion of the partial gear, and at least either the operation of the clamping mechanism and the operation of releasing and bringing the disc holder from and into contact with the disc, is brought about by a mechanism other than the with-teeth portion and interlocked to the partial gear while the with-teeth portion is spaced apart from the disc holder.

Since with the above construction the disc is transferred by the with-teeth portion of the partial gear provided in the timing control mechanism, while operating the clamping mechanism with the mechanism other than the with-teeth portion and interlocked to the partial gear while the with-teeth portion is spaced apart from the disc holder, it is possible to highly accurately control the timings of causing the disc transfer and the holding and releasing of the disc on and from the turntable. In addition, since no members are present which undergo a great linear displacement for transferring the disc and also for operating the clamping mechanism, it is possible to reduce the size of the apparatus, simplify the construction, and reduce the cost of manufacture.

According to the invention, the disc holder may have a rack which is meshed with the with-teeth portion of the partial gear. In this case, the partial gear and the disc holder are thus directly meshed with each other, and the construction is further simplified.

According to the invention, a further construction is provided, in which the partial gear and the disc holder are coupled together via a rocking member, which has an arcuate rack to be meshed with the with-teeth portion of the partial gear. The disc holder is displaced while the with-teeth portion of the partial gear is in mesh with the arcuate rack. With this construction, it is possible to set the ratio between the rotational angle of partial gear and the displacement of the disc holder, i.e., the displacement of the disc, as desired according to the distance from the axis of rocking movement of the rocking member to the point of coupling between the rotative member and the disc holder, which facilitates the design and manufacture.

According to the invention, a further construction is provided, in which the displacement of the disc holder between the disc receiving position and the position to release and bring the disc holder from and into contact with the disc, are brought about by the with-teeth portion of a single partial gear. With the common use of the single partial gear for the two different kinds of displacement of the disc holder, the construction is further simplified.

According to the invention, a further construction is provided, in which a part of the with-teeth portion used for the transfer of the disc holder between the disc receiving position and the disc transferring position, is used for releasing and bringing the disc holder from and into contact with the disc. With the common partial use of the with-teeth portion, the construction is further simplified.

According to the invention, a further construction is provided, in which the disc holder is elastically locked by elastic locking means at a position spaced part from the disc. It is thus possible to reliably prevent occasional joggling of the disc holder to strike the rotating disc during play-back.

According to the invention, a further construction is provided, in which a corner part of a rear portion of the apparatus is used as displacement zone of the optical pick-up and also for disposing an optical pick-up drive, and the other corner part of the rear portion of the appearance is used to dispose the motor.

According to the invention, a further construction is provided, in which the disc holder has a pair of clamp members capable of being opened and closed and for diametrically clamping the edge of the disc. This disc holder can take hold of the disc edge to be ready for carrying the disc with it into the apparatus with a simple construction, thus further simplifying the construction of the apparatus.

According to the invention, a further construction is provided, in which the pair of clamp portions of the disc holder each have an inclined surface for scooping up the disc when the clamp members approach the disc.

With this construction, the disc holder can be displaced more readily and safely without possibility of contact of parts in the apparatus with the recording areas of the disc.

According to the invention, a further construction is provided, in which the pair of clamp members of the disc holder are biased away from each other by a bias spring, and the spacing between them is controlled by a pair of holder guides. This construction permits such design that the spacing between the pair of clamp members is broadened when the disc is inserted and also when the disc holder is released from the disc, and narrowed for the transfer of the disc with the disc holder.

According to the invention, a further construction is provided, in which the clamping forces of the pair of clamp members applied to the disc are reinforced while the clamp members are held in an approached state by the clamp members. In this case, the disc holder can more reliably take hold of the disc for reliably transferring the disc.

According to the invention, a further construction is provided, in which portions of the disc holder in contact with the disc are made of a soft braking material. This construction permits more liable transfer of the disc by the disc holder.

BRIEF DESCRIPTION OF THE DRAWINGS

These and other objects, features and advantages of the invention will become more apparent upon reading of the following detailed specification and drawings, in which:

FIGS. 7A and 7B are schematic views showing different states of the relation between a cam pin and a clamping mechanism;

DETAILED DESCRIPTION OF THE PREFERRED EMBODIMENTS

Figure 1:
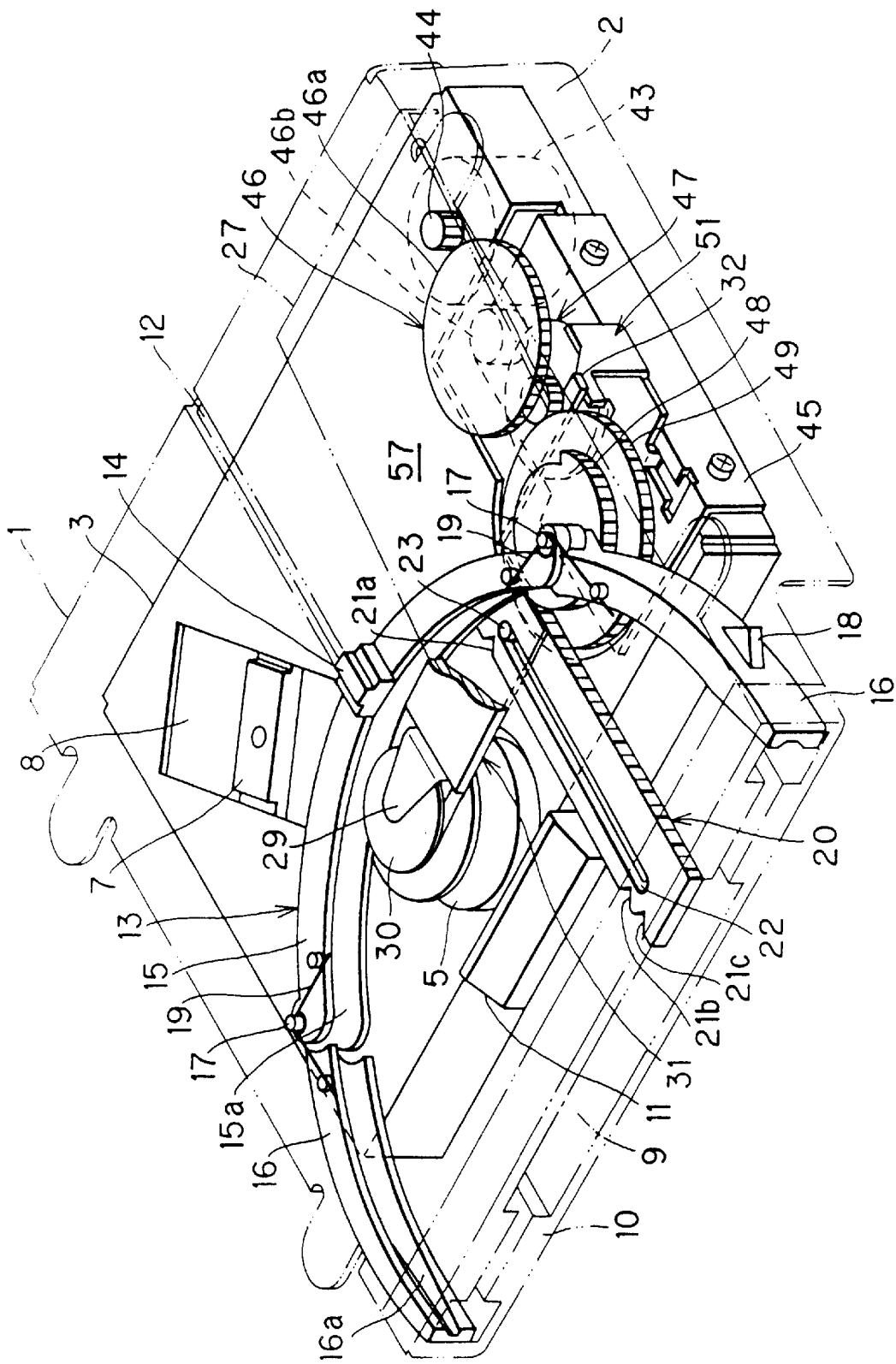
FIG. 1 is a perspective view showing a mechanical part of the first embodiment of the disc playing apparatus according to the invention.

A first embodiment of the disc playing apparatus according to the invention will now be described with reference to FIGS. 1 to 9.

The apparatus comprises a main frame 1 having depending side walls 2 formed on the opposite sides, and a sub-frame 3 secured to the left and right side walls 2 (FIGS. 1 to 5). A disc drive motor 4 is secured to the underside of the sub-frame 3. A turntable 5 disposed above the sub-frame 3 is secured to the drive shaft of the motor 4. An optical pick-up 7 for playing data recorded on a disc 6, is mounted in the sub-frame 3. The optical pick-up 7 is capable of being reciprocated along an opening 8 formed in the sub-frame 3 between a position in the vicinity of the turntable 5 and a position in the vicinity of the left corner of the apparatus. By the above arrangement, the turntable 5 and the optical pick-up 7 are invariable or fixed in position in the axial direction of the turntable 5.

On the front end of the main frame 1 a synthetic resin member 10 is mounted, which has a disc inserting slot 9 for inserting the disc 6 therethrough (FIG. 1). On the front end of the sub-frame 3 a guide 11 is mounted, which guides the disc 6 inserted through the disc inserting slot 9 to a position over the turntable 5. The main frame 1 has a guide groove 12 formed in its inner surface and extending in the direction of insertion of the disc 6. A slider 14 provided on a disc holder 13 is slidably received in the guide groove 12. The slider 14 is integral with the top center of an arcuate member 15 of the disc holder 13. The arcuate member 15 has a groove 15a formed on the inner side for receiving the edge of the disc 6.

Clamp members 16 which also are arcuate and have inner side grooves 16a for receiving the outer edge of the disc 6, are pivotally coupled by pins 17 to the opposite ends of the arcuate member 15. The grooves 16a each have upper and lower inclined surfaces which flare outward. Particularly, the lower inclined surface functions to scoop up the disc 6. The clamp members 16 each have a triangular protuberance 18 provided on the back or outer side and biased in the opening direction by a bias spring 19 provided between each of them and the arcuate member 15. A rack 20 which extends in the direction of insertion of the disc 6, is integral with the underside of the arcuate member 15 of the disc holder 13 at a rightward position. On its right side, the rack 20 has teeth formed along a line. On its left side, it has three triangular recesses 21a, 21b and 21c. It further has a guide groove 22 extending substantially over its entire length. A guide pin 23 as a guide projection is engaged into the guide groove 22 so that undesired rolling of the disc holder 13 can be prevented. The guide pin 23 and the guide groove 22 constitute rolling prevention means for the disc holder 13.

An elastic locking member 24 made from a leaf spring, is mounted on the sub-frame 3, and is selectively engaged in one of the triangular recesses 21a to 21c.

The arcuate member 15 with the rack 20 and the pair of clamp members 16 together constitute the disc holder 13.

The inner surfaces of the opposite side walls 2 of the main frame 1 serve as holder guides to be in contact with the triangular protuberances 18 of the disc holder 13. The side walls 2 each have two holes 25 and 26. Each triangular protuberance 18 is engaged with each hole 25 when the disc holder 13 is at a disc receiving position ready to receive the disc 6, i.e., an end position of displacement on the side of the disc inserting slot 9, and is engaged into each hole 26 when the disc holder 13 reaches a position (FIG. 5), after slight displacement of the disc holder 13 from a disc transfer position (FIG. 4), at which the disc 6 is transferred to and from the turntable 5. When each triangular protuberance 18 gets into each hole 25 or 26, the disc clamp members 16 are opened to be spaced apart by a distance greater than the diameter of the disc 6 by the elastic forces of the bias springs 19.

When the opposite side triangular protuberances 18 are in contact with the inner surfaces of the side walls 2, the pair of disc clamp members 16 are held spaced apart a smaller distance, and the outer edge of the disc 6 is received in the grooves 15a and 16a of the arcuate and disc clamp members 15 and 16. In this state, the free ends of the pair of disc clamp members 16 are found on the outer side of the diametrical line L (FIG. 3) of the disc 6 perpendicular to the inserting direction thereof, and the disc holder 13 is taking hold of the outer edge of the disc such that it can carry the disc 6 along it into the apparatus.

A disc clamper support 27 is vertically pivotally mounted at one end on the sub-frame 3 (FIGS. 1 and 7). The disc clamper support 27 is downwardly biased by a spring 28, and it is provided with an elastic member 29 coupled to its free end. The elastic member 29 supports a disc clamper 30. The disc clamper support 27, the spring 28 and the disc clamper 30 constitute a clamping mechanism 31. The disc clamper support 27 has an engagement piece 32.

Figure 9:
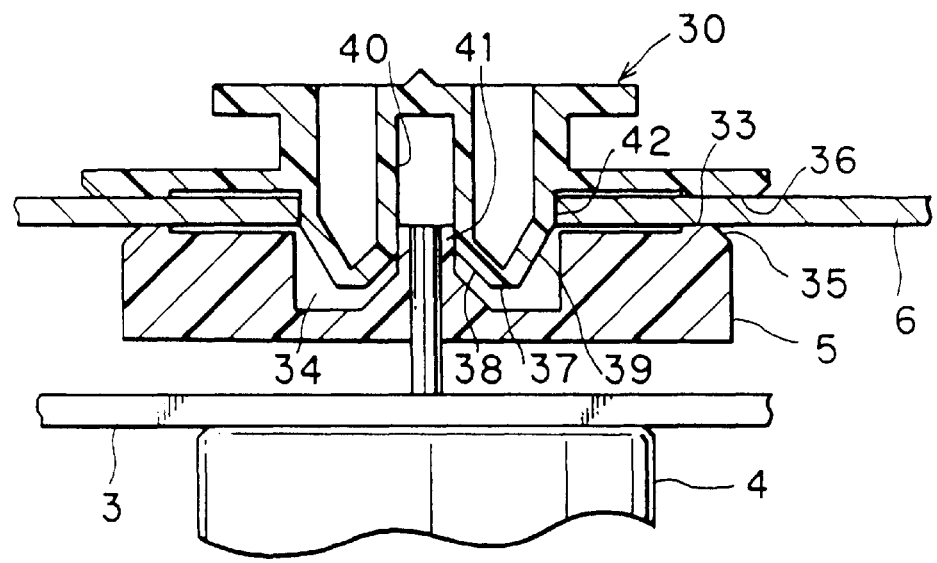
FIG. 9 is a sectional view showing a turntable and a clamper.

As shown in FIG. 9, the top of the turntable 5 is a disc holding surface 33 for prescribing the height level of the disc 6. The turntable 5 has no higher level portion than the disc holding surface 33. It also has a mounting hole to which the drive shaft of the disc drive motor 4 is fixed, and an annular recess 34 coaxially surrounding the mounting hole. The turntable 5 further has a tapered guide surface 35 terminating in its top, i.e., the disc holding surface 33, for facilitating the insertion of the disc 6.

The disc clamper 30 has an urging portion 36 for urging the disc 6 on the disc holding surface 33 and a boss 37 to be inserted through the center hole of the disc 6 into the annular recess 34.

The boss 37 is cylindrical in outer shape, and has an inner and an outer tapered guide surface 38 and 39 extending from its free end and a cylindrical surface 40 extending from the tapered guide surface 38. The annular recess 38 of the turntable 5 has a cylindrical surface 41 which engages with the cylindrical surface 40. The turntable 5 and the disc clamper 30 are centered to each other by the engagement of the cylindrical surfaces 40 and 41 with each other. The boss 37 further has a cylindrical surface 42 extending from its outer tapered guide surface 39. The cylindrical surface 42 is engaged in the center hole of the disc 6 to restrict displacement of the disc 6 in a horizontal direction perpendicular to the vertical axial direction of the turntable 5.

Figure 6:
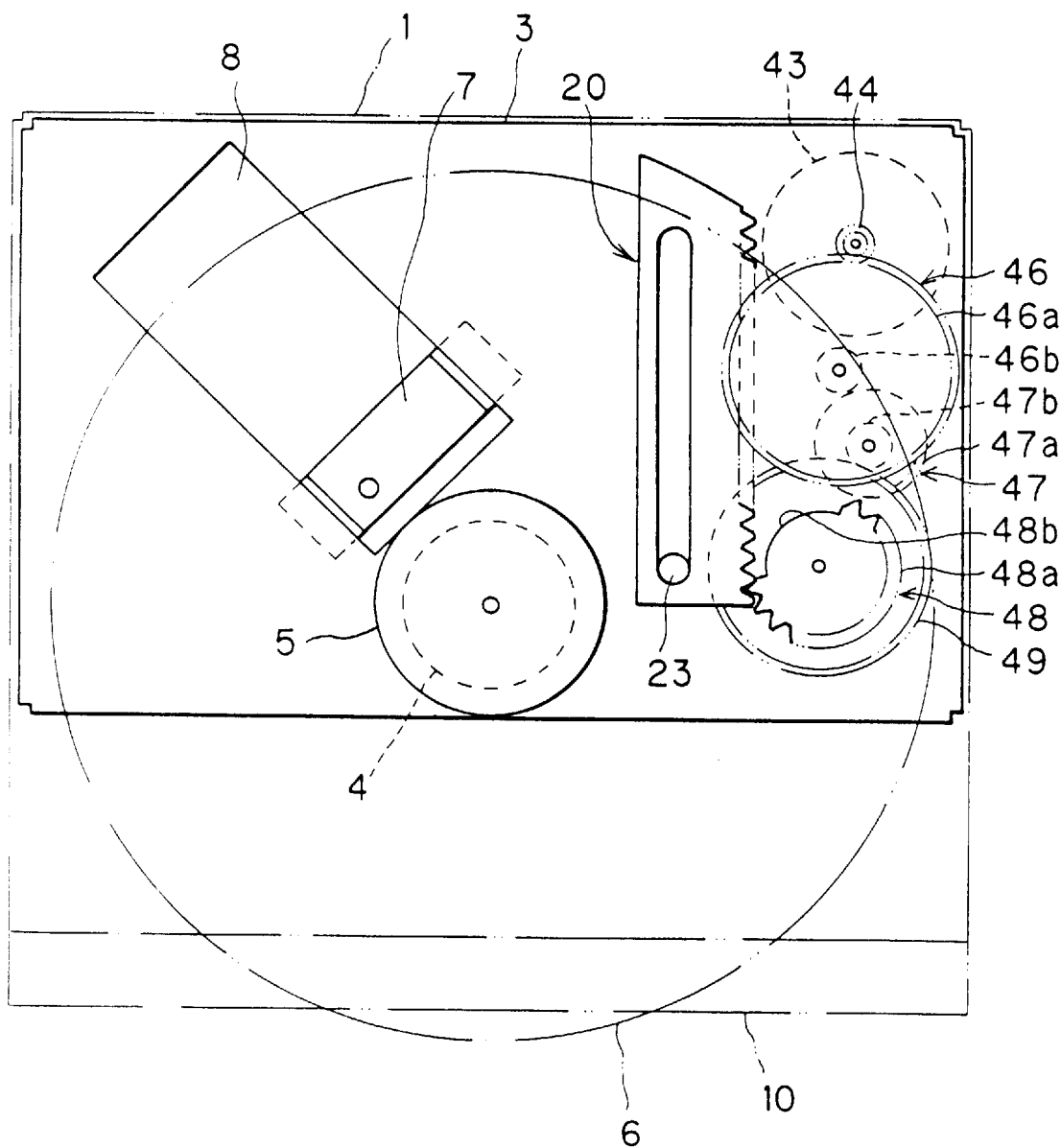
FIG. 6 is a schematic plan view showing the relation between an optical pick-up and a timing control mechanism.

A disc loading motor 43 is secured to the underside of the sub-frame 3. As shown in FIG. 6, the motor 43 is disposed in a rear part of the apparatus other than the zone of the displacement of the optical pick-up 7, specifically at a position adjacent the right side of the apparatus. The drive shaft of the motor 43 has a small motor gear 44 secured to its portion extending upward from the sub-frame 3.

Figure 8A:
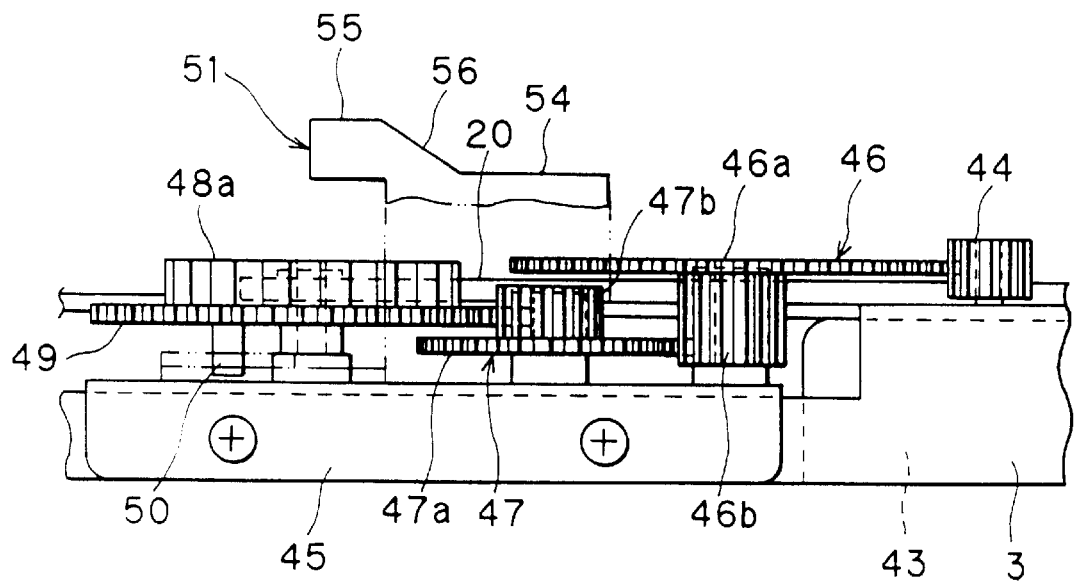
FIG. 8A is a side view showing a timing control mechanism.
Figure 8B:
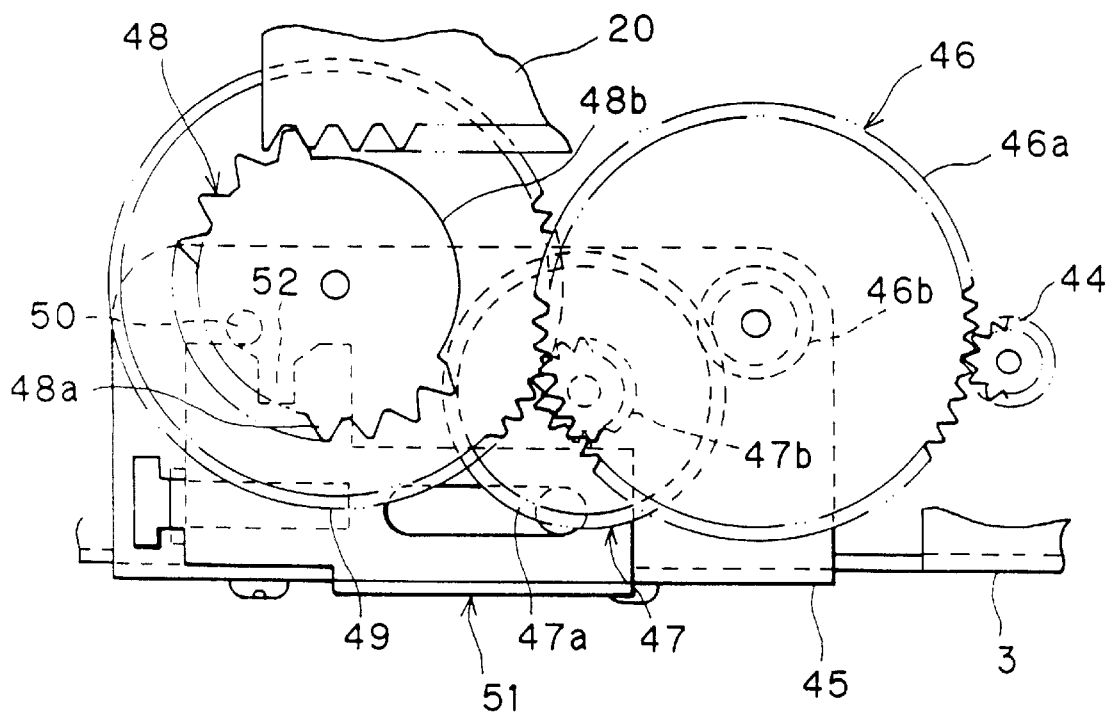
FIG. 8B is a front view showing a timing control mechanism.

A bracket 45 is secured to the right side wall of the sub-frame 3. A first speed reduction gear 46 having a large and a small gear, a second speed reduction gear 47 also having a large and a small gear, and a large diameter gear 49 with an integral partial gear 48 formed on the upper side thereof, are rotatably mounted on the bracket 45. The partial gear 48 has a with-teeth portion or toothed portion 48a and a without-teeth portion 48b. The with-teeth portion 48a can mesh with the rack 20. The angle ratio between the with- and without-teeth portions 48a and 48b is appropriately set in relation to lengths of operations of relevant mechanisms. The large diameter gear 49 has a cam pin 50 extending from its underside. As shown in FIG. 8, the first speed reduction gear 46 has its large gear 46a in mesh with the motor gear 44 and its small gear 46b in mesh with the large gear 47a of the second speed reduction gear 47. The second speed reduction gear 47 has its small gear 47b in mesh with the large gear 49. The rotation of the motor 43 is thus transmitted after speed reduction to the partial gear 48.

A cam member 51 is mounted on top of the bracket 45 such that it can be advanced and retreated with respect to the direction of insertion of the disc 6. The cam member 51 is bent substantially at right angles, and its horizontal portion has an elongated engagement groove 52 extending in a direction perpendicular to the direction of its advancement and retreat. The engagement groove 52 has an open end, and the cam pin 50 noted above can enter the groove 52 from the open end. The top of the upright portion of the cam member 51 constitutes a cam surface 53. The cam surface 53 has a low level horizontal surface 54, a high level horizontal surface 55, and an inclined surface 56 connecting the two horizontal surfaces 54 and 55, and it is located underneath the engagement piece 32 of the disc clamper support 27.

The gears 44 and 46 to 49 and the cam member 51 constitute a timing control mechanism 57. The timing control mechanism 57 causes the operations of the disc holder 13 and the disc clamping mechanism 31 in a predetermined sequence.

The timing control mechanism 57 includes a first interlock means constituted by the rack 20 which is coupled to the disc holder 13 and can be meshed with the with-teeth portion 48a of the partial gear 48 to cause the disc holder 13 to transfer the disc 6 between the disc receiving position and the disc transfer position, and also includes a second interlock means constituted by the large gear 49, the cam pin 50 and the cam member 51 which are coupled to the clamping mechanism 31 to operate the clamping mechanism 31, when the first interlock means and the with-teeth portion 48a are out of mesh with each other, by interlocking with a portion of the partial gear 48 other than the with-teeth portion 48a.

The disc holder 13, the clamping mechanism 31 and the timing control mechanism 57 are related as described below.

Before disc insertion, as shown in FIG. 7A, the engagement piece 32 of the disc clamper support 27 is resting on the high level horizontal surface 55 of the cam member 51, and the disc clamper 30 is held at a position above the turntable 5. Also, the disc holder 13 is at the front end position of its displacement, each triangular protuberance 18 is received in each hole 25, and the pair of clamp members 16 are held spaced apart a distance greater than the diameter of the disc 6. The elastic locking member 24 is held received in the most rearward triangular recess 21a and holding the disc holder 13 elastically locked at the position noted above. The end of the with-teeth portion 48a of the partial gear 48 is in mesh with the rear end of the rack 20, and the cam pin 50 is found outside the engagement groove 52.

Figure 2:
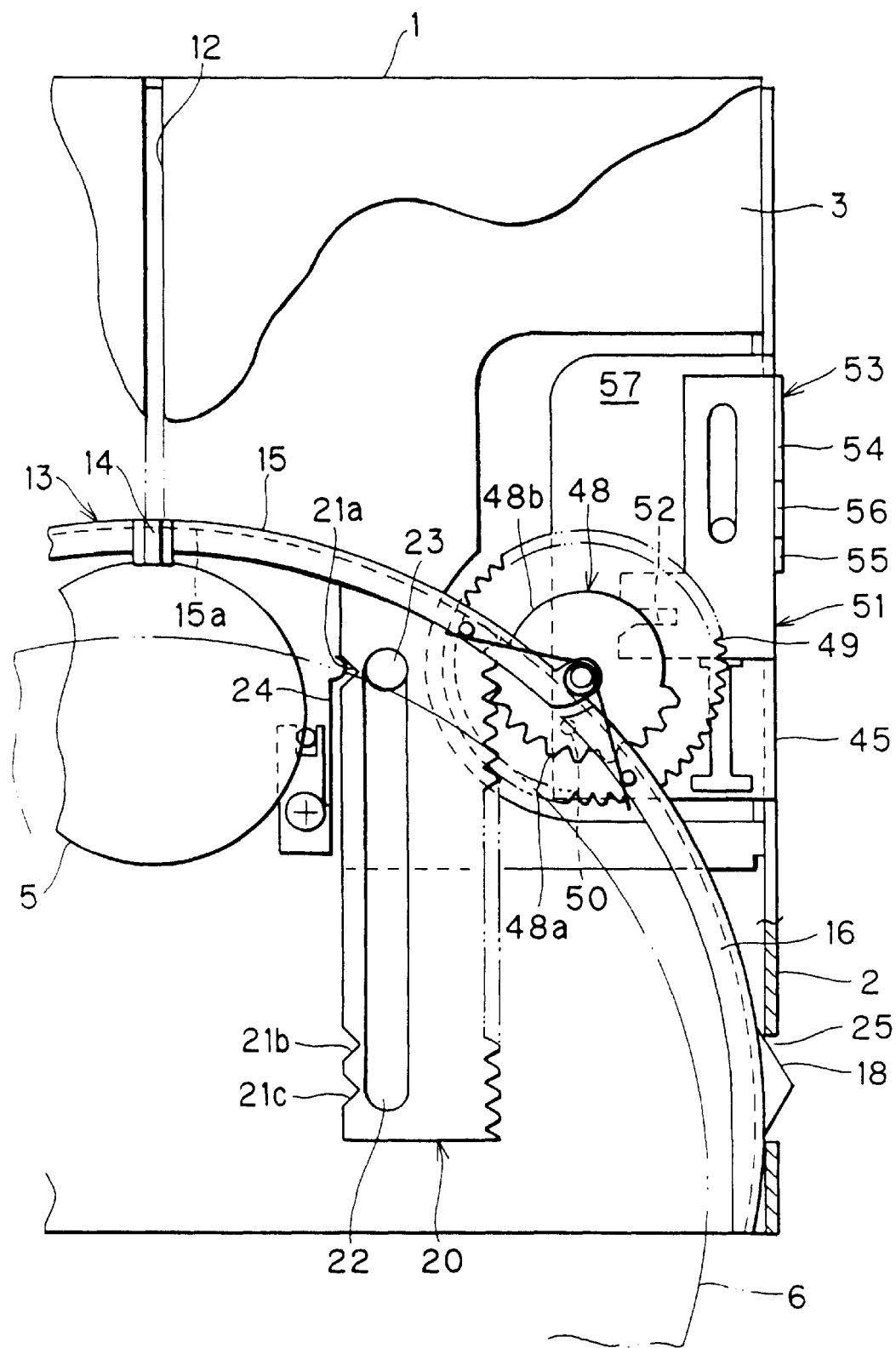
FIG. 2 is a fragmentary schematic plan view showing the same embodiment with mission of a main frame.
Figure 3:
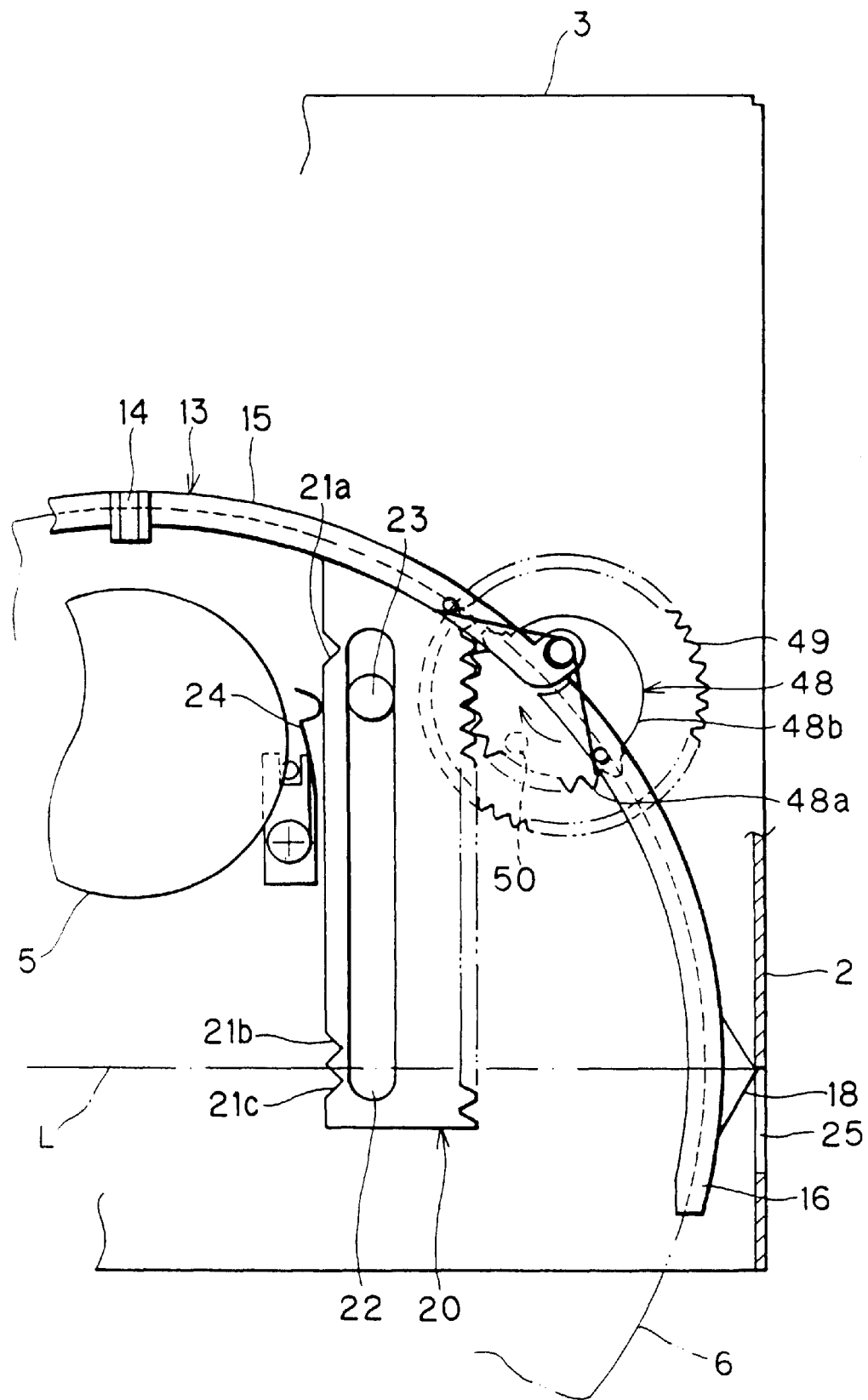
FIG. 3 is a fragmentary schematic plan view showing the same embodiment with omission of the main frame.

This state is shown in FIG. 2. By inserting the disc 6 from this state through the disc inserting slot 9 and pushing the disc 6 with the outer edge thereof received in the groove 15a of the arcuate member 15, the disc holder 13 is slightly displaced, causing each triangular protuberance 18 to be detached from each hole 25 and brought into contact with each side wall 2, thus closing the pair of clamp members 16.

The disc holder 13 thus takes hold of the disc 6 with its pair of disc clamp members 16 to be ready to carry the disc 6 along with it into the apparatus. By sensing this state, the disc loading motor 43 turns to be rotated in one direction to cause rotation of the partial gear 48 and the large diameter gear 49 in the clockwise direction in FIG. 3, thus bringing the disc holder 13 together with the disc 6 rearwardly of the apparatus. Even if the disc 6 is taken hold of by a hand at this time, it is forcibly brought forth because its outer edge is clamped by the pair of disc clamp members 16.

Figure 4:
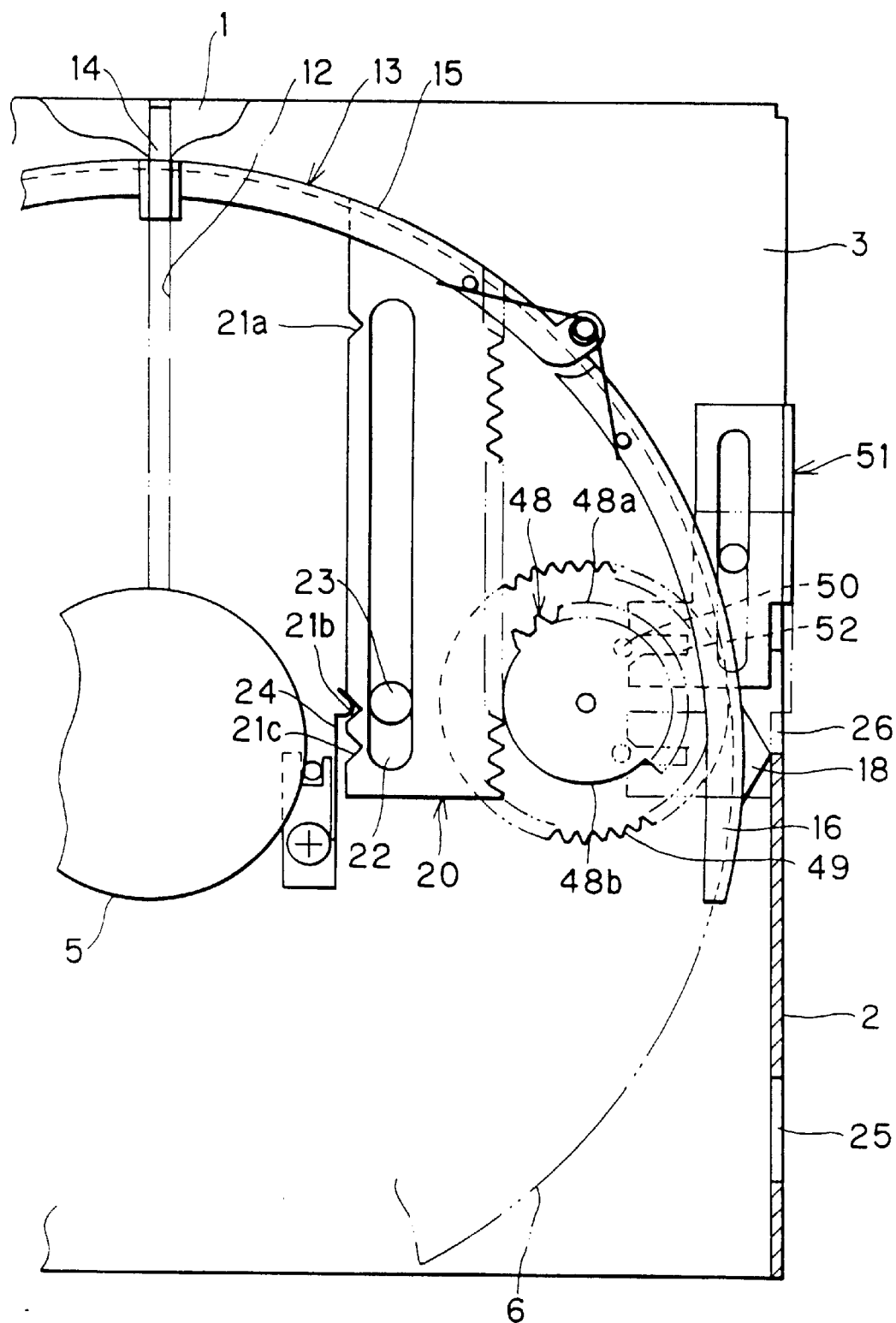
FIG. 4 is a fragmentary schematic plan view showing the same embodiment with omission of the maim frame.

When the disc holder 13 reaches the disc transfer position, at which the disc 6 is transferred to and from the turntable 5, as shown in FIG. 4, the with-teeth portion 48a of the partial gear 48 is detached from the rack 20, whereupon the disc holder 13 is tentatively stopped. At this time, the elastic locking member 24 is received in the second triangular recess 21b of the rack 20 to elastically lock the disc holder 13 at that position. At the same time, the cam pin 50 of the large diameter gear 49 enters the engagement groove 52 of the cam member 51, and the cam member 51 is thus moved forth with the rotation of the large diameter gear 49. As a result, the engagement piece 32 of the disc clamper support 27 is displaced from its position in engagement with the high level cam surface 55 via the inclined surface 56 to the low level cam surface 54 as shown in FIG. 7B. With the displacement of the engagement piece 32, the disc clamper support 27 is pivotally displaced downward, so that the boss 37 of the disc clamper 30 is inserted through the center hole of the disc 6 into the recess 34 of the turntable 5. Also, the disc 6 is forcibly held on the disc holding surface 33 of the turntable 5 by the urging portion 36. The disc 6 is thus loaded, i.e., held on the turntable 5 (FIG. 9). When this state is brought about, the cam pin 50 is separated from the engagement groove 52.

Figure 5:
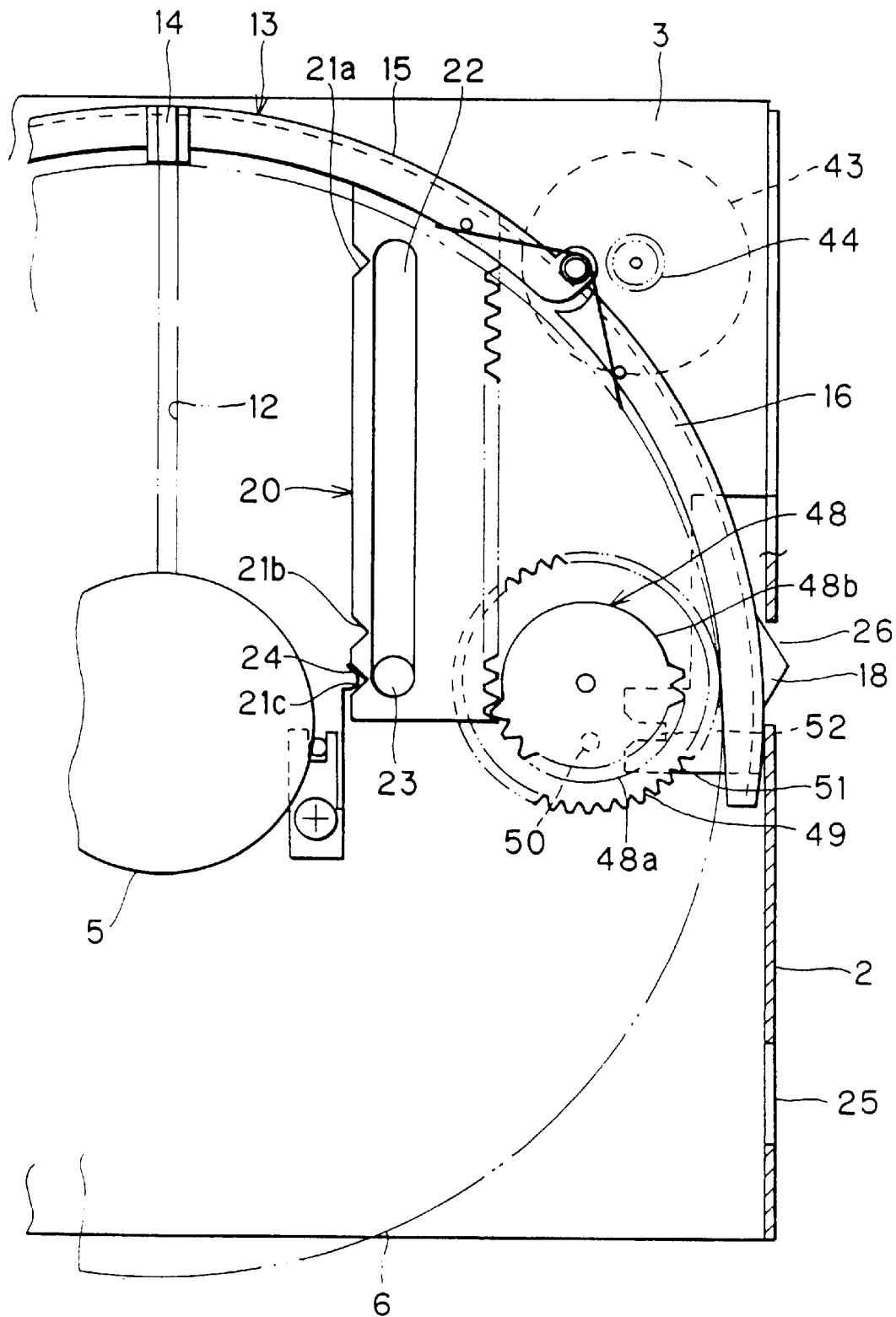
FIG. 5 is a fragmentary schematic plan view showing the same embodiment with omission of the main frame.

Subsequently, the with-teeth portion 48a of the partial gear 48 is brought into mesh again with the rack 20. As a result, the disc holder 13 turns again to be displaced rearwardly of the apparatus, and each triangular protuberance 18 is received in each hole 26, whereupon the pair of clamp members 16 are opened again to increase the distance between them. In this state, the arcuate member 15 is separated from the disc 6 and displaced rearwardly of the apparatus (FIG. 5). The disc loading motor 43 senses this position of the disc holder 13 and is turned off, while the disc drive motor 4 is turned on this time, thus causing an operation of playing data recorded on the disc 6 by the optical pick-up 7. The elastic locking member 24 is received at this time in the triangular recess 21c of the rack 20 which is closest to the disc inserting slot 9, thus elastic locking the disc holder 13 at a position spaced apart from the disc 6.

When a disc unloading operation is caused, the disc loading motor 43 is caused to be rotated in the direction opposite to the disc loading direction, and the timing control mechanism 57 is operated in the opposite sequence to that at the time of the disc loading. In this case, the partial gear 48 is rotated in the counterclockwise direction to cause displacement of the disc holder 13 toward the front of the apparatus. As a result, the arcuate member 15 is brought into engagement with the disc 6. Also, each triangular protuberance 18 is detached from each hole 26 and brought into contact with the inner surface of each side wall 2. The spacing between the pair of clamp members 16 is thus narrowed to provide a brake effect (FIG. 4).

At this time, the with-teeth portion 48a of the partial gear 48 is detached from the rack 20, and the cam pin 50 is caused to enter the engagement groove 52 of the cam member 51 and displace the cam member 51 rearwardly of the apparatus. With this displacement of the cam member 51, the engagement piece 32 of the disc clamper support 27 is relatively displaced from its position in contact with the low level cam surface 54 via the inclined surface 56 to the high level cam surface 55. The disc clamper 30 is thus separated from the turntable 5, thus releasing the disc 6 from the turntable 5 (FIG. 7A).

At the same time, the cam pin 50 gets out of the engagement groove 52, and then the with-teeth portion 48a of the partial gear 48 is brought into mesh again with the rack 20 and brings back the disc holder 13 together with the disc 6 toward the disc inserting slot 9. When the disc holder 13 is brought back to a position outwardly beyond the disc inserting slot 9, the disc loading motor 43 is stopped. At this time, the elastic locking member 24 is received in the triangular recess 21a adjacent the rear end of the rack 20 to elastically lock the disc holder 13. Also, each triangular protuberance 18 is received again in each hole 25, thus opening the pair of clamp members 16. In this state, the disc 6 can be readily taken out.

With the construction as described above, the disc is transferred by the with-teeth portion 48a of the partial gear 48 in the timing control mechanism 57, and the clamping mechanism 31 is operated by the cam member 51 interlocked to the partial gear 48 while the with-teeth gear portion 48a thereof is out of mesh with the rack 20 of the disc holder 13. It is thus possible to obtain highly accurate control of the timings of the disc transfer and the holding and releasing of the disc on and from the turntable. In addition, among the components of the timing control mechanism 57, only the cam member 51 is linearly displaced. Since the size and displacement of the cam member 51 are not so great, it is possible to reduce the size of the apparatus. It is further possible to simplify the construction and reduce the cost of manufacture.

Since the disc holder 13 has the rack so that the partial gear 48 is directly meshed with it, the construction is further simplified.

Since the with-teeth portion 48a of the single partial gear 48 serves to operate the disc holder 13 for both the transfer between the disc receiving position and the disc transfer position and the transfer away from and into contact with the disc 6, the construction is further simplified.

Particularly, the partial gear 48 has the single with-teeth portion 48a, the entirety of which is used to the above transfer of the disc holder 13 between the disc receiving position and the disc transfer position, while it is partly used to transfer the disc holder 13 away from and into contact with the disc 6. Since the with-teeth portion 48a of the partial gear 48 commonly serves the above two different kinds of tasks, it is possible to reduce the size of the partial gear 48, thus further reducing the size of the apparatus.

Since the disc holder 13 is selectively locked by the elastic locking member 24 at the disc receiving position, the disc transfer position, and the position spaced apart from the disc 6, it is possible to prevent occasional movement of the disc holder 13 and stabilize the operation.

Since a part of a rear portion of the apparatus including one corner is used as a moving zone of the optical pick-up 7 and also a zone in which the drive of the optical pick-up 7 (including the pick-up drive motor) is disposed, while utilizing the other part including the other corner for disposing the disc loading motor 43, the motor 43 can be disposed by utilizing a vacant space in the apparatus, thus permitting further size reduction of the apparatus.

Since the disc holder 13 includes the pair of clamp members 16 for diametrically clamping the outer edge of the disc 6, only the outer edge of the disc 6 can be taken hold of to be carried into the apparatus with a simple construction. The construction thus can be further simplified.

Since the pair of clamp members 16 has the inclined surfaces for scooping up the disc 6 as the disc 6 approaches them, the disc 6 can be transferred safely by the disc holder 13 without possibility of contact of its recording areas by components in the apparatus.

The bias springs 19 for biasing the pair of clamp members 16 away from each other, permits broadening the spacing between the pair of clamp members 16 when inserting the disc 6 and also when bringing the disc holder 13 away from the disc 6, and also permits narrowing the spacing to have the pair of clamp members 16 in contact with the inner surfaces of the opposite side depending walls 2 (i.e., holder guides) of the main frame 1 and enhancing the clamping force.

Figure 10:
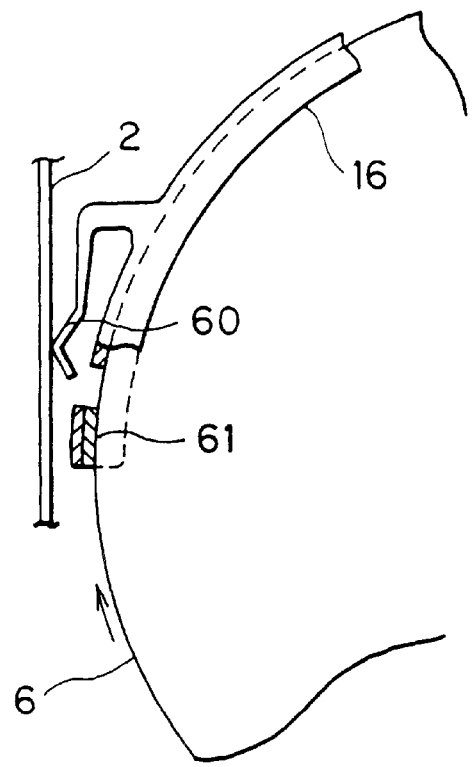
FIG. 10 is a plan view showing a modification of the disc holder.

As shown in FIG. 10, it is possible to provide an elastic member 60 in lieu of the triangular protuberance 18 on the back side of each clamp member 16. In this case, while the pair of clamp members 16 are held in the narrowed spacing state by the opposite side walls 2, the clamping forces of the clamp members 16 to clamp the disc 6 are reinforced by the elastic forces of the elastic members 60. The disc holder 13 thus can take hold of the disc 6 more reliably, and the disc 6 can be transferred more reliably.

As shown in FIG. 10, a portion of each clamp member 16 of the disc holder 13 that is in contact with the disc 6 may be made of felt or like soft braking material. In this case, the disc 6 can be held and transferred more reliably by the disc holder 13. In addition, when unloading the disc an enhanced brake effect on the disc 6 is obtainable.

Figure 11:
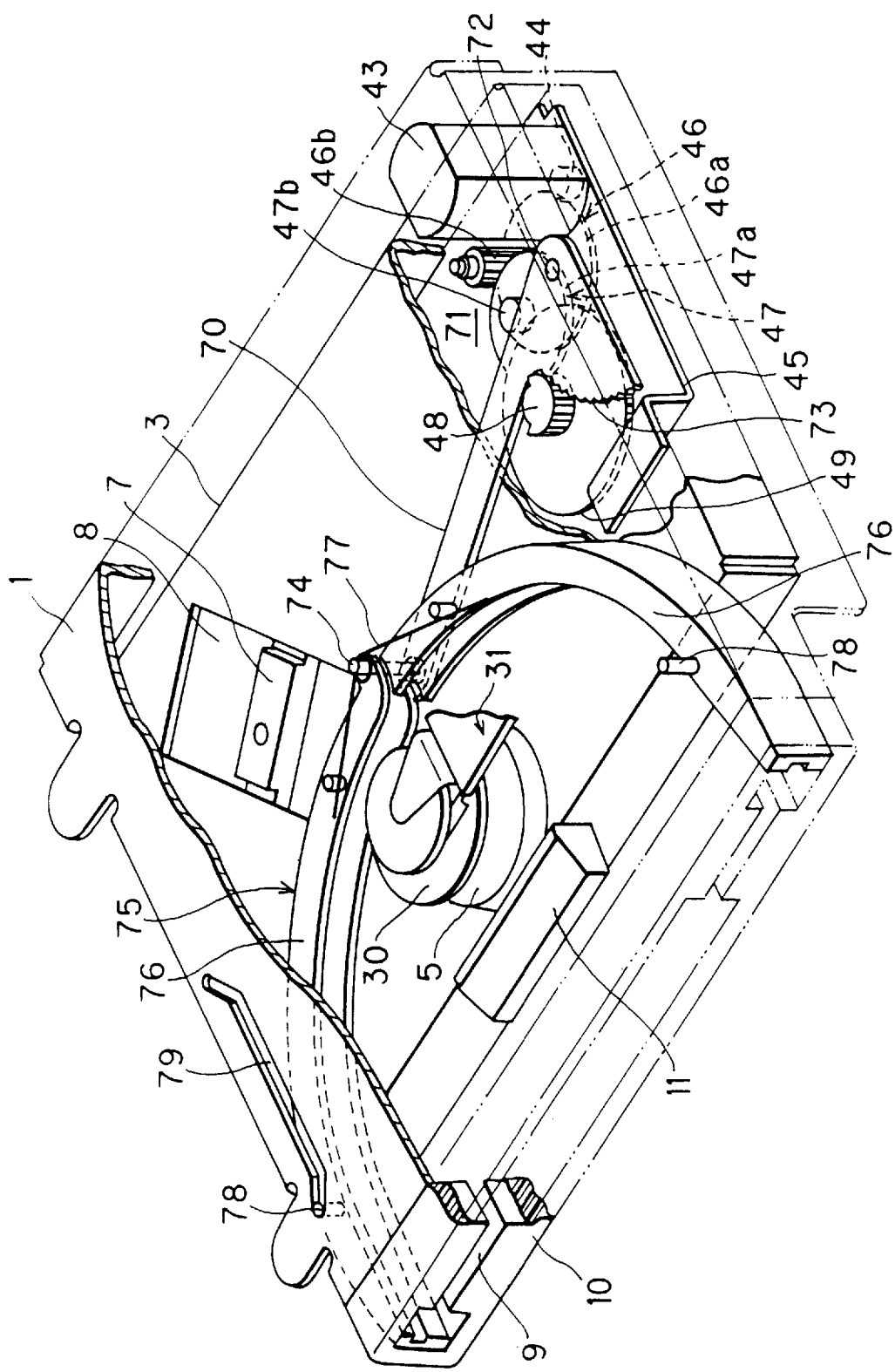
FIG. 11 is a perspective view showing a disc loading mechanism in a second embodiment of the invention.

A second embodiment of the invention will now be described with reference to FIG. 11. FIG. 11 is a perspective view showing the mechanical part of the disc playing apparatus. Parts like those in the previous first embodiment are designated by like reference numerals and symbols, and are not described in detail. This embodiment is different from the previous embodiment in that a rocking member is provided between the disc holder and the partial gear.

Like the first embodiment, disc loading motor 43, first speed reduction gear 46 having large and small gears 46a and 46b, second speed reduction gear 47 having large and small gears 47a and 47b, and large diameter gear 49 with integral partial gear 48 at the top, are mounted on the bracket 45, and the rotation of the motor 43 is transmitted via the first and second speed reduction gears 46 and 47 to the partial gear 48 and the large diameter gear 49. Also, like the first embodiment, the large gear 49 has the cam pin 50 depending from the underside. The cam pin 50 is in the same relation to the cam plate 51 as in the first embodiment.

Reference numeral 70 designates a rocking member, which constitutes a timing control mechanism 71 together with the motor gear 44, the first and second speed reduction gears 47 and 48, and the large diameter gear 49.

The rocking member 70 has one end pivotally mounted on a pin 72, and has an arcuate rack 73 centered on the pin 72. The arcuate rack 73 can be selectively meshed with the with-teeth portion 48a of the partial gear 48. The cam pin 50 is engaged in the engagement groove 52 in the cam member 51, when the partial gear 48 is brought to a position to face the arcuate rack 73 after detachment of the with-teeth portion 48a from the rack 73. The rocking member 70 has a pin 74 secured to its free end, and a pair of arcuate clamp members 76 constituting a disc holder 75 each have one end pivotally mounted on the pin 74.

On the pin 74 a bias spring 77 is further mounted to bias the pair of clamp members 76 away from each other. Each clamp member 76 has an engagement protuberance 78 projecting from its top and received in a guide groove 79 formed in the main frame 1.

The guide grooves 79 have such a shape that the pair of clamp members 76 are opened when the disc holder 75 is found at a position in a front part of the apparatus and also when the disc holder 75 is displaced rearwardly from a disc transfer position to transfer the disc to and from the turntable 5.

The disc holder 75, the clamping mechanism 31 and the timing control mechanism 71 are in the same relationship to one another as in the first embodiment, although the second embodiment is different from the first embodiment since in the second embodiment the disc holder 75 is transferred between a front and a rear position in the apparatus with the rocking movement of the rocking member 70 caused by the rotation of the partial gear 48.

Thus, in the second embodiment, like the first embodiment, the disc 6 is transferred by the with-teeth portion 48a of the partial gear 48 in the timing control mechanism 71, and the clamping mechanism 31 is operated by the cam member 51 interlocked to the partial gear 48 while the with-teeth portion 48a thereof is out of mesh with the rack 20 of the disc holder 13. It is thus possible to highly accurately control the timings of causing the disc transfer and the holding and releasing of the disc on and from the turntable. In addition, among the components of the timing control mechanism 71 only the cam member 51 is linearly displaced, and the size and displacement of the cam member 51 are not great. It is thus possible to reduce the size of the apparatus. The construction can also be simplified to reduce the cost of manufacture.

Moreover, the rocking member 70 has the arcuate rack 73, which is to be meshed with the with-teeth portion 48a of the partial gear 48 as means for coupling the partial gear 48 and the disc holder 75 via the rocking member 70, and the disc holder 75 is transferred while the with-teeth 48a of the partial gear 48 is in mesh with the rack 73.

The above construction has a further effect that the ratio between the rotational angle of the partial gear 48 and the displacement of the disc holder 75 (i.e., displacement of the disc) as desired in dependence on the distance from the axis (i.e., pin 72) of rocking movement of the rocking member 70 to the point of coupling between the rocking member 70 and the disc holder 75.

While the invention has been described above in conjunction with the first and second embodiments, these embodiments are by no means limitative, and may be variously changed or modified.

What is claimed is:

1. A disc playing apparatus wherein a disc inserted through a disc inserting slot is capable of being held on a disc holding surface of a turntable for playing back data with an optical pick-up, and wherein said disc can be released from said turntable and forced back out of said disc inserting slot by a disc unloading operation, comprising:

a disc holder capable of moving said disc from a disc receiving position in which said disc holder engages only the outer edge of said disc, through a disc transfer position in which said disc holder transfers said disc onto or from said turntable, to a remote position in which said disc holder is remote from said disc supported on said turntable, said turntable having a vertical axis around which said turntable can be rotated, and being fixed in a vertical direction, said turntable having no higher level portion than said disc holding surface;

a rack operatively connected to said disc holder;

a partial gear having a with-teeth portion and a without-teeth portion, said partial gear being operable such that said with-teeth portion engages said rack when said disc holder is in said disc receiving position, and such that it rotates in one direction to move said disc holder to said disc transfer position to cause said disc to be transferred onto said turntable, wherein said with-teeth portion can be disengaged from said rack, and then re-engaged with said rack, thereby moving said disc holder into said remote position;

a loading motor adapted to rotate in a first direction to cause said partial gear to be rotated in said one direction when it is sensed that said disc is held by said disc holder in said disc receiving position, and to cause said partial gear to stop rotating when it is sensed that said disc holder reaches said remote position, and wherein said loading motor is caused to be rotated in a second direction opposite said first direction upon the beginning of said disc unloading operation so as to rotate said partial gear in a reverse direction opposite said one direction, and to cause said partial gear to stop rotating in said reverse direction when it is sensed that said disc holder has returned to said disc receiving position;

a disc clamper movable between a clamped position for urging said disc onto said turntable, and a released position for releasing said disc from said turntable;

means for operatively connecting said disc clamper with said partial gear so as to move said disc clamper to said clamped position when said partial gear is rotating in said one direction while said with-teeth portion is disengaged from said rack, and to move said disc clamper to said released position when said partial gear is rotating in said reverse direction; and wherein said disc holder which has been released from said disc held on said turntable is elastically locked in said remote position by an elastic locking member.

2. The disc playing apparatus according to claim 1, wherein a corner part of a rear portion of said apparatus is used as a displacement zone of said optical pick-up and for disposing an optical pick-up drive, and another corner part of said rear portion of said apparatus is used for disposing said motor.

3. The disc playing apparatus according to claim 1, wherein said disc holder has a pair of left and right clamp members capable of being opened and closed and diametrically clamping the outer edge of said disc.

4. A disc playing apparatus wherein a disc inserted through a disc inserting slot is capable of being held on a disc holding surface of a turntable for playing back data with an optical pick-up, and wherein said disc can be released from said turntable and forced back out of said disc inserting slot by a disc unloading operation, comprising:

a disc holder capable of moving said disc from a disc receiving position in which said disc holder engages only the outer edge of said disc, through a disc transfer position in which said disc holder transfers said disc onto or from said turntable, to a remote position in which said disc holder is remote from said disc supported on said turntable, said turntable having a vertical axis around which said turntable can be rotated, and being fixed in a vertical direction, said turntable having no higher level portion than said disc holding surface;

a rack operatively connected to said disc holder;

a partial gear having a with-teeth portion and a without-teeth portion, said partial gear being operable such that said with-teeth portion engages said rack when said disc holder is in said disc receiving position, and such that it rotates in one direction to move said disc holder to said disc transfer position to cause said disc to be transferred onto said turntable, wherein said with-teeth portion can be disengaged from said rack, and then re-engaged with said rack, thereby moving said disc holder into said remote position;

a loading motor adapted to rotate in a first direction to cause said partial gear to be rotated in said one direction when it is sensed that said disc is held by said disc holder in said disc receiving position, and to cause said partial gear to stop rotating when it is sensed that said disc holder reaches said remote position, and wherein said loading motor is caused to be rotated in a second direction opposite said first direction upon the beginning of said disc unloading operation so as to rotate said partial gear in a reverse direction opposite said one direction, and to cause said partial gear to stop rotating in said reverse direction when it is sensed that said disc holder has returned to said disc receiving position;

a disc clamper movable between a clamped position for urging said disc onto said turntable, and a released position for releasing said disc from said turntable;

means for operatively connecting said disc clamper with said partial gear so as to move said disc clamper to said clamped position when said partial gear is rotating in said one direction while said with-teeth portion is disengaged from said rack, and to move said disc clamper to said released position when said partial gear is rotating in said reverse direction said apparatus further comprising a rocking member having an arcuate rack capable of being meshed with said with-teeth portion of said partial gear, said rocking member being capable of rocking to cause the movement of said disc holder from one position to another.

* * * * *